(12) United States Patent
Thyamagundalu et al.

(10) Patent No.: US 10,291,523 B2
(45) Date of Patent: *May 14, 2019

(54) DYNAMIC HOST CONFIGURATION PROTOCOL RELAY IN A MULTIPOD FABRIC

(71) Applicant: Cisco Technology, Inc., San Jose, CA (US)

(72) Inventors: Sanjay Thyamagundalu, Sunnyvale, CA (US); Ravindra N. Rathi, Cupertino, CA (US); Ayaskant Pani, Fremont, CA (US); Satyadeva Konduru, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/460,614

(22) Filed: Mar. 16, 2017

(65) Prior Publication Data

US 2017/0195225 A1    Jul. 6, 2017

Related U.S. Application Data

(63) Continuation of application No. 14/707,352, filed on May 8, 2015, now Pat. No. 9,634,934.

(51) Int. Cl.
*G06F 15/177* (2006.01)
*H04L 12/749* (2013.01)
*H04L 29/12* (2006.01)
*H04L 12/931* (2013.01)
*H04L 29/06* (2006.01)

(52) U.S. Cl.
CPC .......... *H04L 45/741* (2013.01); *H04L 49/354* (2013.01); *H04L 61/2015* (2013.01); *H04L 69/14* (2013.01); *H04L 69/22* (2013.01); *H04L 61/256* (2013.01); *H04L 61/2514* (2013.01)

(58) Field of Classification Search
None
See application file for complete search history.

(56) References Cited

U.S. PATENT DOCUMENTS 8,160,063 B2    4/2012 Maltz et al.
2012/0023207 A1*   1/2012 Gandhewar ......... H04L 61/2038
                                                    709/221

(Continued)

FOREIGN PATENT DOCUMENTS

WO    98/26530 A1    6/1998

*Primary Examiner* — Sithu Ko
(74) *Attorney, Agent, or Firm* — Edell, Shapiro & Finnan, LLC

(57) ABSTRACT

A packet is generated at a first network connected device for transmission to a destination network device through a network comprising a plurality of pods. At least two of the plurality of pods are within separate management domains, and generating the packet comprises generating the packet with a first identifier and a second identifier. The first identifier indicates a pod of the plurality of pods in which the destination network connected device is located, and the second identifier indicates an identity of the destination network connected device within the pod of the plurality of pods. The packet is transmitted from the first network connected device to the destination network connected device.

20 Claims, 6 Drawing Sheets

(56) References Cited

U.S. PATENT DOCUMENTS

| | | | |
|---|---|---|---|
| 2013/0024553 A1* | 1/2013 | Mittal | H04L 41/0893 |
| | | | 709/222 |
| 2013/0250779 A1 | 9/2013 | Meloche et al. | |
| 2013/0346618 A1 | 12/2013 | Holkkola | |
| 2014/0092901 A1* | 4/2014 | Kapadia | H04L 45/745 |
| | | | 370/390 |
| 2016/0330120 A1 | 11/2016 | Thyamagundalu et al. | |

* cited by examiner

300

305
GENERATING, AT A FIRST NETWORK CONNECTED DEVICE, A PACKET FOR TRANSMISSION TO A DESTINATION NETWORK DEVICE THROUGH A NETWORK COMPRISING A PLURALITY OF PODS, WHEREIN GENERATING THE PACKET COMPRISES GENERATING THE PACKET WITH A FIRST IDENTIFIER AND A SECOND IDENTIFIER, THE FIRST IDENTIFIER INDICATING A POD OF THE PLURALITY OF PODS IN WHICH THE DESTINATION NETWORK CONNECTED DEVICE IS LOCATED, AND THE SECOND IDENTIFIER INDICATING AN IDENTIFY OF THE DESTINATION NETWORK CONNECTED DEVICE WITHIN THE POD OF THE PLURALITY OF PODS

310
TRANSMITTING THE PACKET FROM THE FIRST NETWORK CONNECTED DEVICE TO THE DESTINATION NETWORK CONNECTED DEVICE

FIG.3

DYNAMIC HOST CONFIGURATION PROTOCOL RELAY IN A MULTIPOD FABRIC

RELATED APPLICATIONS

This application is a continuation application of U.S. patent application Ser. No. 14/707,352, filed on May 8, 2015, the entirety of which is incorporated herein by reference.

TECHNICAL FIELD

The present disclosure relates to multipod networks, and in particular, routing packets in multipod networks.

BACKGROUND

In a multipod network using a Virtual Extensible Local Area Network (VxLAN) overlay, the pods of the multipod network may be interconnected by an external Internet Protocol (IP) underlay. In certain implementations, fabric networks are used in the infrastructure on which the VxLAN is overlaid. Forwarding within the fabric is between VxLAN tunnel endpoints (TEPs). The default gateway for each bridge domain is a pervasive switch virtual interface (SVI) configured on top-of-rack (ToR) switches wherever the bridge domain of a tenant is present. The pervasive SVI has an anycast gateway per subnet, which is global across the fabric.

Some multipod networks may be formed from separate pods that were previously independent networks configured at different points in time without consideration of the other pods. Accordingly, addresses and identifiers may overlap between the different pods within a multipod network. In such a multipod network, a Dynamic Host Configuration Protocol (DHCP) client and a DHCP server can be spread across different pods of the multipod network.

BRIEF DESCRIPTION OF THE DRAWINGS

FIG. 3 is a flowchart illustrating a process for generating and transmitting a response packet configured to provide DHCP relay in a multipod network, according to an example embodiment.

DESCRIPTION OF EXAMPLE EMBODIMENTS

Overview

According to example embodiments, a packet is generated at a first network connected device for transmission to a destination network device through a network comprising a plurality of pods. At least two of the plurality of pods are within separate management domains, and the packet includes a first identifier and a second identifier. The first identifier indicates a pod of the plurality of pods in which the destination network connected device is located, and the second identifier indicates an identity of the destination network connected device within the pod of the plurality of pods. The packet is transmitted from the first network connected device to the destination network connected device.

According to other example embodiments, a packet is generated at a first network connected device for transmission to a destination network device through a network comprising a plurality of pods. At least two of the plurality of pods are within separate management domains, and the packet includes a first identifier and a second identifier. The first identifier indicates a pod of the plurality of pods in which the first network connected device is located, and the second identifier indicates an identity of the first network connected device within the pod of the plurality of pods. The packet is transmitted from the first network connected device to the destination network connected device.

Example Embodiments

Figure 1:
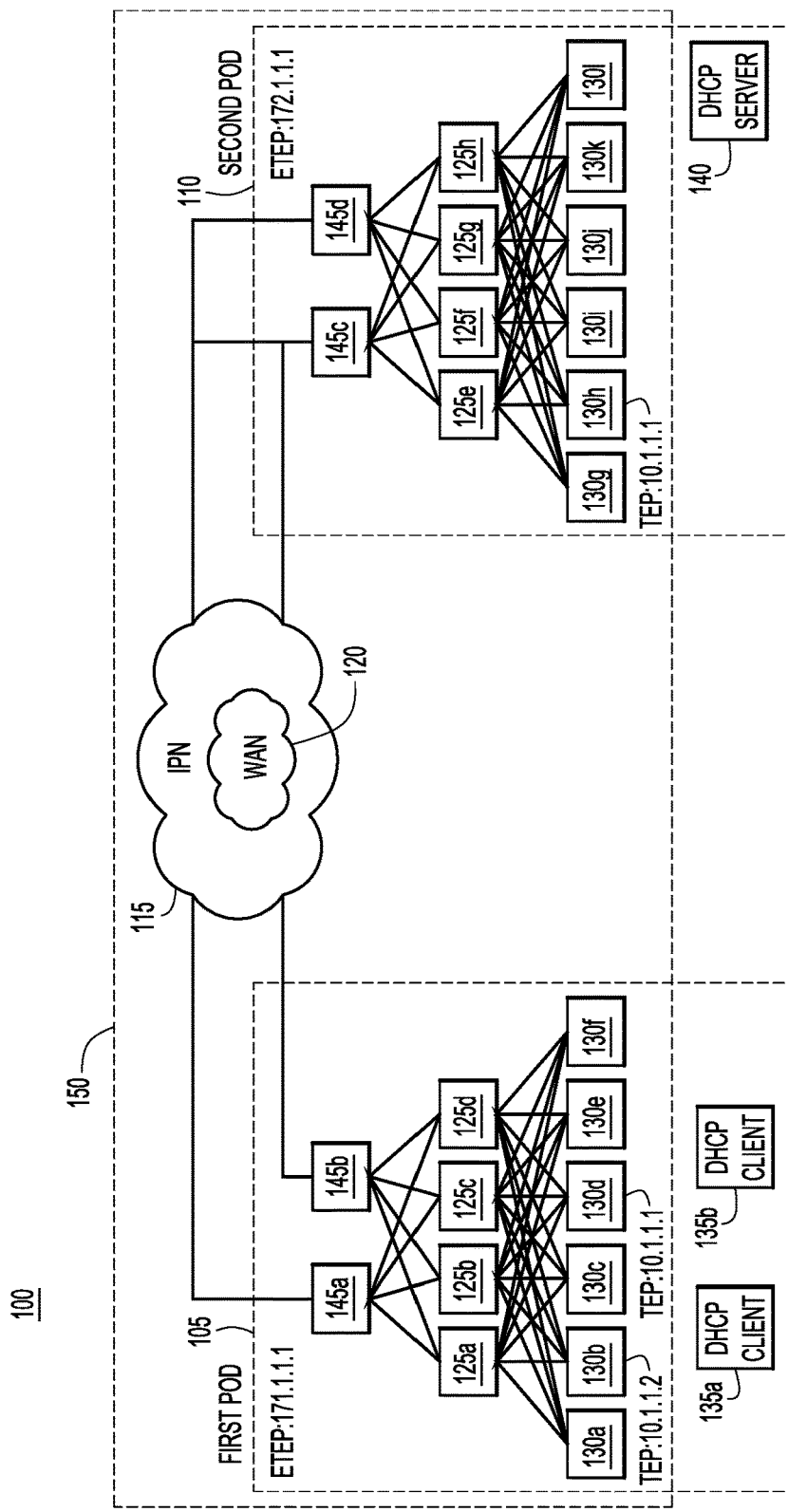
FIG. 1 is an illustration of a multipod network configured to provide DHCP relay, according to an example embodiment.

With reference made to FIG. 1, depicted therein is a multipod network 100. As used herein, a "multipod network" is a network that contains different managed domains, at least at the infrastructure level. For example, multipod network 100 comprises a first fabric network 105, i.e., a first pod, and a second fabric network 110, i.e., a second pod. The two pods 105 and 110 are joined to form a single tenant network, meaning the logical arrangement of tenant services in multipod network 100 is such that services can be seamlessly mapped between network devices in either pod 105 or pod 110 in a manner transparent to the end users. But, at the infrastructure level, first pod 105 and second pod 110 exist in different management domains. For example, first fabric network 105 and second fabric network 110 may have been assembled and configured at different times, as separate independent networks. Accordingly, when first fabric network 105 was configured the infrastructure level addresses assigned to its elements only had to be unique to fabric network 105. Similarly, when second fabric network 110 was configured the addresses assigned to its elements only had to be unique to second fabric network 110. As such, the underlayer infrastructure addresses between the network elements in the first pod, i.e., first fabric network 105, and the second pod, i.e., second fabric network 110, may overlap. As will be described in greater detail below, combining first pod 105 and second pod 110 into a single tenant space may present unique traffic routing challenges. These challenges may be particularly evident when implementing Dynamic Host Configuration Protocol (DHCP) exchanges within the tenant space.

According to the specific example of FIG. 1, first fabric network 105 is combined with second fabric network 110 through Interpod Network (IPN) 115. According to the specific example embodiment of FIG. 1, IPN 115 includes Wide Area Network (WAN) 120. Each of first fabric network 105 and the second fabric network 110 includes a plurality of spine switches 125a-h and top-of-rack switches (TORs) 130a-l. Connected to TORs 130a-l are specific network elements. For example, DHCP clients 135a and 135b are connected to TORs 130b and 130d, respectively, in first fabric network 105, while DHCP server 140 is connected to TOR 130*l* in second fabric network 110. Also included in multipod network 100 are multipod leaf (ML) network connected devices 145*a-d*. ML devices 145*a-d* provide network address translation (NAT) services for traffic travelling between first fabric network 105 and second fabric network 110 through IPN 115.

Finally, a tenant virtual extensible local area network (VxLAN) 150 is overlaid on the infrastructure provided by the combination of first fabric network 105, second fabric network 110 and IPN 115. With VxLAN 150 in place, each of TOR switches 130*a-l* will be given the same pervasive Switch Virtual Interface (SVI) address in the tenant VxLAN space.

As discussed above, first fabric network 105 and second fabric network 110 may have been established in such a way that the addresses and identifiers for the elements of the two fabric networks may overlap. For example, within first fabric network 105, each of TORs 130*a-f* will have different infrastructure identifiers. Specifically, TOR 130*b* has a Tunnel Endpoint (TEP) identifier (ID) of "10.1.1.2" while TOR switch 130*d* has a TEP ID of "10.1.1.1." TORs 130*a*, 130*c*, 130*e* and 130*f* will similarly have different TEP IDs. On the other hand, because second fabric network 110 was configured independently from first fabric network 105, the TEP IDs for TOR switches 130*g-l* may overlap with those for TOR switches 130*a-f*. As illustrated in FIG. 1, such an overlap has taken place with TOR switch 130*h* having a TEP ID of "10.1.1.1," the same TEP ID as TOR switch 130*d*. This can be problematic when traffic is sent to a TOR switch using the SVI address when routing the traffic. As each TOR switch in the infrastructure shares the same SVI address, and one or more TOR switches may also share the same TEP ID, an ambiguity is created regarding which TOR switch the traffic should ultimately be sent to. The techniques described herein allow this overlap of identifiers to be compensated for as traffic is exchanged between first fabric network 105 and second fabric network 110.

For example, when DHCP client 135*b* first connects to VxLAN 150 through TOR switch 130*d*, a broadcast DHCP request message is generated. This broadcast message may be relayed to DHCP server 140 by, for example, TOR switch 130*d*. When relaying the DHCP request message to DHCP server 140, the message may be sent by TOR switch 130*d* as a unicast packet addressed to the server. It is during this relaying that the option 82 field of the DHCP message may be populated.

Specifically, in order to uniquely identify the location of DHCP client 135*b*, the DHCP request message relayed by TOR switch 103*d* may include the infrastructure TEP ID for TOR switch 130*d* i.e., "10.1.1.1." This infrastructure ID is used to identify the TOR switch servicing DHCP client 135*b* because each of TOR switches 130*a-l* will have the same SVI in VxLAN 105. This TEP ID may be included in the DHCP option 82 field of the relayed message. Yet, including the TEP ID for TOR switch 130*d* may be insufficient to uniquely identify TOR switch 130*d* as the originating TOR for the DHCP request message. Specifically, TOR switch 130*h* in second fabric network 110 also has a TEP ID of "10.1.1.1." In order to resolve this ambiguity, the DHCP request message relayed from TOR switch 130*d* will further utilize the DHCP option 82 field to include a pod identifier.

According to the example of FIG. 1, first fabric network 105 is given a pod identifier in the form of an external TEP (ETEP) ID, with a value of "171.1.1.1." Similarly, second fabric network 110 is also given an ETEP ID, but with a value of "172.1.1.1." These ETEP IDs may be unique publicly routable addresses. According to other examples, the pod identifiers can take the form of a "site/pod_id" identifier. Specifically, if first fabric network 105 and second fabric network 110 are located in one or more datacenters, each of these pods can be uniquely identified by their physical location (i.e., the datacenter in which they are located) combined with an identifier unique to the pod within that datacenter.

After relay, the DHCP request message will be received at DHCP server 140, which will generate a DHCP response message. The DHCP response message will be a unicast message that utilizes the pervasive SVI address of relaying TOR switch 130*d*. Yet, because the pervasive SVI is shared by all of TOR switched 130*a-130l*, the pervasive SVI does not uniquely identify TOR switch 130*d* as the source of the relayed DHCP request message, and therefore, does not uniquely identify the location of DHCP client 135*b*. In order to uniquely identify TOR switch 130*d*, the DHCP response message will utilize its own option 82 field to echo back the TEP ID for TOR switch 130*d* and the ETEP ID for first fabric network 105 that were received in the option 82 field of the relayed DHCP request message. Absent both of these identifiers, the DHCP response message may not be accurately returned to the endpoint associated with DHCP client 135*b*, as the DHCP response message may not return to TOR switch 130*d*.

For example, if the DHCP response message included neither the TEP ID nor the ETEP ID, the message would only include the SVI shared by all of TOR switches 130*a-l*, and therefore, the DHCP response message could not be successfully routed back to TOR switch 130*d*. Similarly, if the DHCP response message is only provided with the TEP ID for TOR switch 130*d*, the DHCP response message may be inaccurately routed to TOR switch 130*h* within second fabric network 110, as both TOR switch 130*d* in first fabric network 105 and TOR switch 130*h* in second fabric network 110 have the overlapping TEP ID of "10.1.1.1." On the other hand, when both the TEP ID for TOR switch 103*d* and the ETEP ID for first fabric network 105 are included in the DHCP response message, TOR switch 130*d* can be uniquely identified as the correct endpoint servicing DHCP client 135*b*.

Specifically, when the DHCP response message generated by DHCP server 140 is received by an intermediate network device, such as any one of TOR switches 130*g-l* and/or spine switches 125*e-h*, the option 82 field of the response message can be evaluated. First, the intermediate network device will evaluate the ETEP ID to determine if the response message is already located within the correct pod. If the ETEP ID is different than the ETEP ID of the present pod, the message will be routed through IPN 115 to the correct pod. On the other hand, if the intermediate device has the same ETEP ID as the ETEP ID included in the option 82 field of the DHCP response message, the TEP ID from the option 82 field will be evaluated. If the TEP ID in the option 82 field matches the TEP ID of the present device, that packet will be consumed and forwarded locally. On the other hand, if the TEP ID is different from the TEP ID of the present device, the packet will be forwarded within the current pod to the device with the TEP ID located within the option 82 field of the DHCP response message.

In other words, the techniques described herein provide a framework that allows DHCP relay to operate in a VxLAN overlay in the presence of pervasive SVIs. The originating underlay source TEP IP address is encoded in the DHCP requests (in option 82) so that the DHCP responses can be relayed to the correct leaf device. The TEP IP address alone may not be sufficient in a multipod network, as each of the pods in the multipod network may have an underlay TEP IP address that is only uniquely routable in the particular pod. This may be the case because there may be overlapping underlay TEP IP addresses in other pods of the multipod network. Accordingly, in addition to the source TEP IP address, a source pod identifier is added to the option 82 encoding of the DHCP request message. The pod identifier can be a site identifier with an accompanying pod identifier or an IP address that may be, for example, the anycast IP address of the pod in IPN 115.

Therefore, the process described above can be summarized as follows. The originating leaf network connected device (e.g., TOR switch 130*d*) that is connected to the client (e.g., DHCP client 135*b*) adds the DHCP option 82 to the DHCP request for the client. The option 82 field will be encoded with the TEP IP address of the originating leaf network connected device and the local pod identifier. The DHCP server responds to the DHCP request with a DHCP response message in which the option 82 encoding from the DHCP request message is echoed back in the option 82 field of the DHCP response message. The DHCP response message will be received at a TOR switch which may or may not be the originating TOR switch. This may be the case because all of the TOR switches in the overlay VxLAN own the same pervasive IP address. The receiving TOR switch will examine the option 82 payload of the DHCP response message to determine the source of the request. Processing follows the rules below:

1. If the POD identifier and the TEP IP address match the local pod and TEP IP address, then the request originated locally, and the packet is consumed for processing by the receiving TOR switch.
2. If the pod identifier matches the local pod but the TEP IP address does NOT match the local TEP IP address, then the packet is forwarded to the TEP IP address in the option 82 field of the DHCP response message.
3. If the pod identifier does not match the local pod identifier, then the packet is forwarded to the ETEP IP address (e.g., the anycast IP address in the IPN) of the destination pod. The transmission of the packet to the correct pod may terminate on any node in the destination pod. Once received at the correct pod, processing indicated in rule 2 above results in the packet being forwarded to the correct TOR switch.

Figure 2:
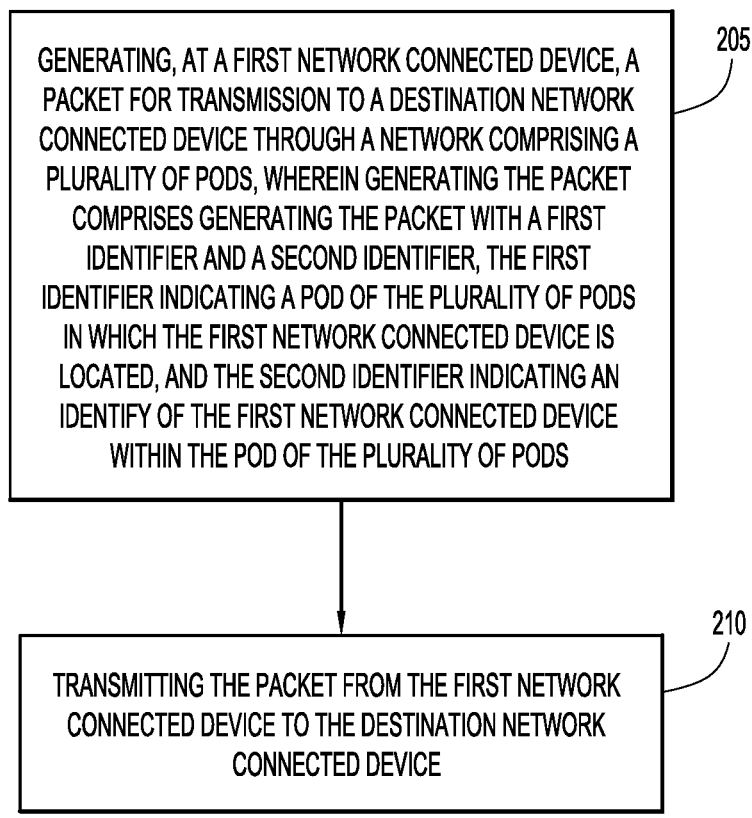
FIG. 2 is a flowchart illustrating a process for generating and transmitting a request packet configured to provide DHCP relay in a multipod network, according to an example embodiment.

With reference now made to FIG. 2, depicted therein is a flowchart illustrating a process 200 described from the "perspective" of a first or originating network connected device, such as DHCP client 130*b* or TOR switch 130*d* of FIG. 1. The process begins at 205 where a packet for transmission to a destination network device (e.g., a DHCP server such as DHCP server 140 of FIG. 1) through a multipod network is generated at a first or originating network connected device. As discussed above, each pod of the multipod network may be a pod within a separate management domain, meaning there may be overlap of TEP IP addresses or other identifiers among the network connected devices arranged within the pods. The generation of the packet involves including a first identifier and a second identifier within the packet. The first identifier may serve as an indication of the pod within which the packet was generated, i.e., the pod in the multipod network in which the first or originating network connected device is located. The second identifier indicates the identity of the first or originating network connected device. For example, the first identifier may be an ETEP or a "site/pod_id" identifier as discussed above with reference to FIG. 1. The second identifier may be the TEP IP address for the first or originating network connected device, such as the TEP IP address for TOR switch 130*d* from FIG. 1.

At 210, the packet is transmitted from the first network connected device to the destination network connected device. The transmission of the packet may comprise relaying the DHCP request message from an originating TOR switch to a DHCP server, as is described above with reference to FIG. 1. Furthermore, the transmission of the packet may include packets traversing TOR switches, spine switches, ML devices, and an IPN, as illustrated above in FIG. 1.

With reference now made to FIG. 3, depicted therein is a flowchart illustrating a process 300 described from the "perspective" of a responding network connected device, such as DHCP server 140 of FIG. 1. The process begins in 305 where a packet for transmission to a destination network device (e.g., a DHCP client such as DHCP client 135*b* of FIG. 1) through a multipod network is generated at a first or responding network connected device. As discussed above, each pod of the multipod network may be a pod within a separate management domain, meaning there may be overlap of TEP IP addresses or other identifiers among the network devices arranged within the pods. The generation of the packet involves including a first identifier and a second identifier within the packet. Unlike the process of FIG. 2, the first identifier in FIG. 3 may serve as an indication of the pod to which the packet is being sent. Specifically, the first identifier identifies the pod in the multipod network in which the destination network connected device is located, i.e., the pod of the device for which the response message is intended. Using the example of FIG. 1, the first identifier may be the ETEP IP address or "site/pod_id" for first fabric network 105 that is encoded in the DHCP option 82 field of the DHCP response message. The second identifier indicates the identity of the destination network connected device. For example, the second identifier may be the TEP IP address for the network connected device to which the packet is a response. According to the specific example of FIG. 1, the second identifier could be the TEP IP address for TOR switch 130*d* included in the option 82 field of the DHCP response message. The first and second identifiers that are included in the DHCP response message may not be "freshly" generated or initially determined by the first network device, e.g., by the DHCP server. Instead, the DHCP server may simply "echo back" the option 82 field received in the DHCP request message that precipitated the sending of the DHCP response message.

At 310, the packet is transmitted from the first network connected device to the destination network connected device. The transmission of the packet may involve transmitting a unicast DHCP response message as described above with reference to FIG. 1. Furthermore, the transmission of the packet may include the unicast packet traversing TOR switches, spine switches, ML devices, and an IPN, as illustrated above in FIG. 1.

Figure 4:
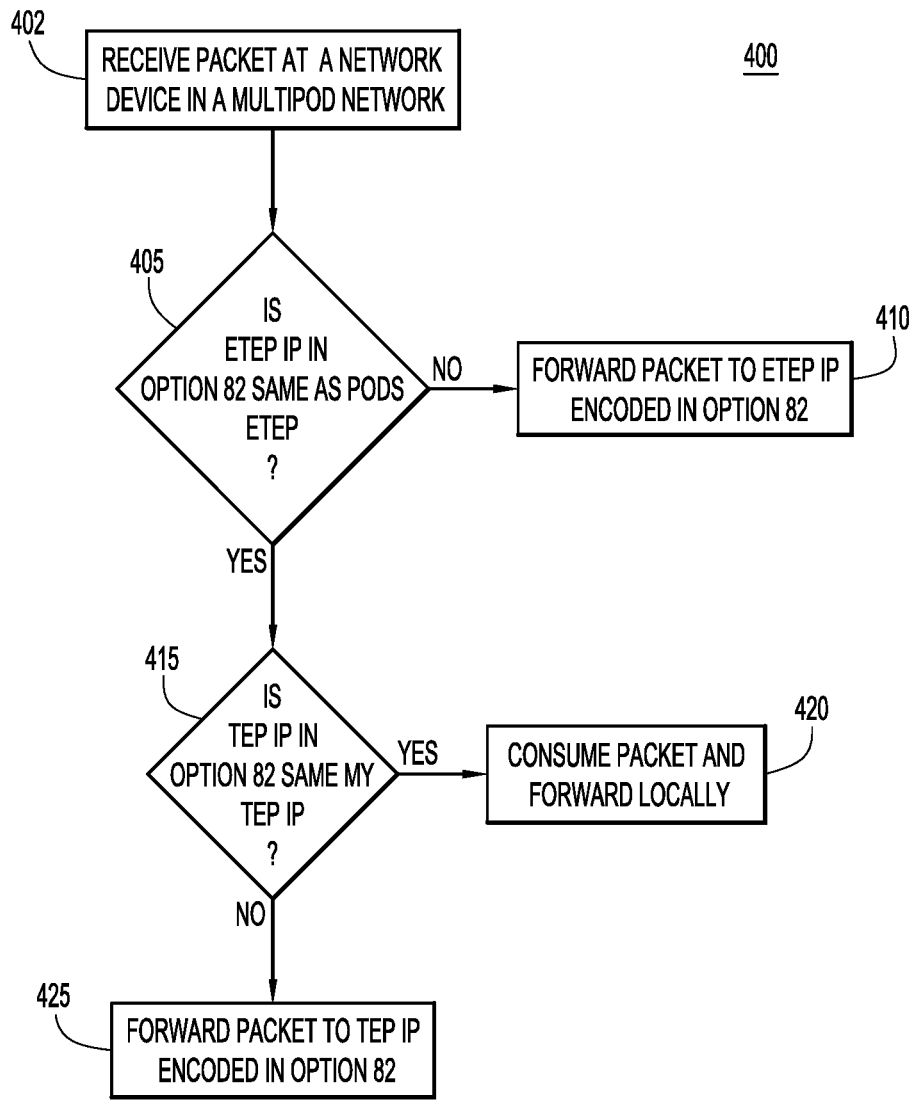
FIG. 4 is a flowchart illustrating a process for processing a packet configured to provide DHCP relay in a multipod network, according to an example embodiment.

With reference now made to FIG. 4, depicted therein is a flowchart illustrating a process 400 for forwarding and/or consuming a received packet according to the techniques described herein. The process begins at 402 where a packet is received at a network connected device within a multipod network. At 405 a first identifier is examined. The first identifier may be embodied as an ETEP identifier encoded within the option 82 field of a DHCP response packet. According to other examples, the first identifier may be a "site/pod_id" identifier. If the first identifier is different than a corresponding identifier of the receiving network connected device, the processing moves to 410 where the packet is forwarded to the pod associated with the first identifier. For example, if the first identifier is an ETEP IP address, and the first identifier does not match the ETEP IP address of the receiving network connected device, the packet is forwarded to the pod with the ETEP IP address matching the first identifier. Similarly, if the first identifier is a "site/pod_id" identifier, and the first identifier does not match the "site/pod_id" identifier of the receiving network connected device, the packet is forwarded to the pod with the "site/pod_id" identifier matching the first identifier.

On the other hand, if the first identifier does match the corresponding identifier for the receiving network connected device, the processing moves to 415. In 415, a second identifier in the received packet is evaluated to see if it matches a corresponding second identifier for the receiving network connected device. For example, if the received second identifier is a TEP IP address, the receiving device will see if the received TEP IP address matches its own TEP IP address. If the addresses match, the packet will be consumed and forwarded locally in 420, e.g., from TOR switch 130d to DHCP client 135b, as described above with reference to FIG. 1. If the received TEP IP address does not match the TEP IP address of the receiving device, the packet is forwarded to the network connected device with the TEP IP address encoded in the received packet, as illustrated in 425.

Figure 5:
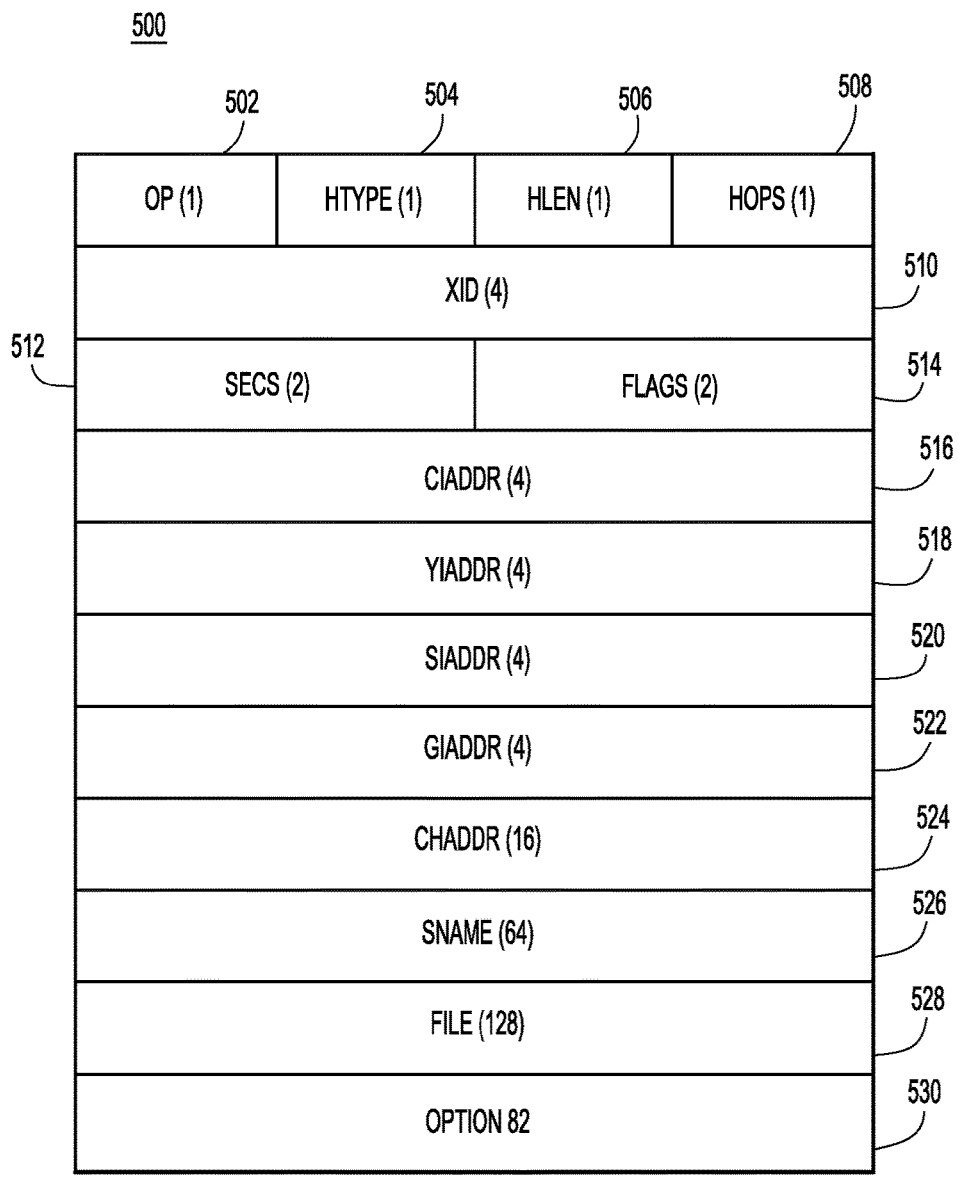
FIG. 5 is a block diagram of a packet structure configured to provide DHCP relay in a multipod network, according to an example embodiment.

Wither reference now made to FIG. 5, depicted therein is an example of a packet, header configured to be used with the techniques described herein. For completeness, fields 502-528 will be described, while field 530 illustrates the option 82 field of a DHCP packet.

Reference numeral 502 provides an indication of the type of operation to be carried out by the packet. For example, depending on the value in field 502, packet 500 can be indicated as being a DHCP request message or a DHCP response message. Field 504 indicates the type of hardware for which the packet has been generated, while field 506 indicates the length of the hardware address for the device for which the packet was generated. Field 508 controls the forwarding of the packet through a hop counter. Field 510 is a transaction identifier, while field 512 is a field that may be used to indicate the number of seconds since the device initiated the DHCP process. Field 514 allows flag values to be set, particularly, an indication of whether or not the device for which the packet has been generated was aware of its IP address at the time the initial DHCP request was sent. Fields 516, 518, 520 and 522 are used to indicate a client IP address, an assigned IP address, a server IP address, and a gateway IP address, respectively. Field 524 provides a layer-2 client address, while field 526 provides a server name. Field 528 allows a requesting device to request or receive a specific boot file.

Field 530 is the DHCP options field. Specifically illustrated in FIG. 5 is the DHCP option 82 field, or the DHCP Relay Agent Information Option. Option 82 was designed to allow a DHCP Relay Agent to insert circuit specific information into a request that is being forwarded to a DHCP server. According to the techniques described herein, the DHCP option 82 field is used to include a pod identifier and an originating network connected device ID as described above. For example, the option 82 field may be used to include the ETEP ID for a pod in multipod network, and a TEP ID for a network connected device located within the pod associated with the ETEP ID. According to other examples, the pod ID may be embodied as a "site/pod_id" identifier.

Figure 6:
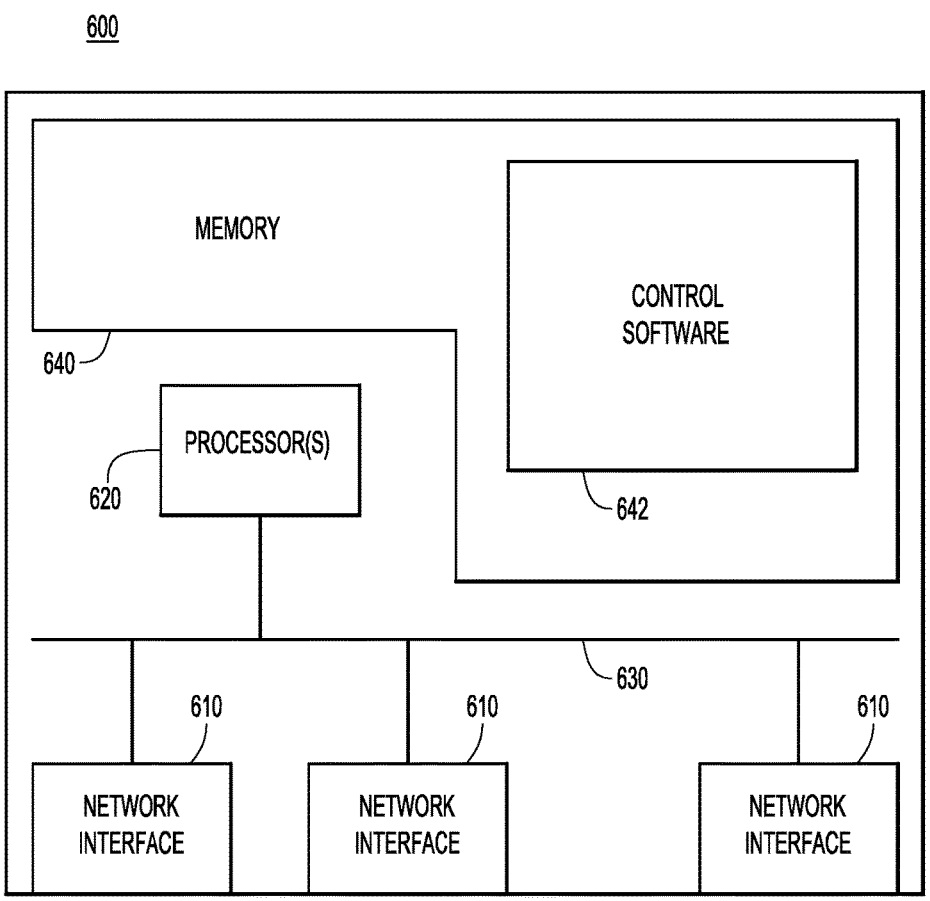
FIG. 6 is a block diagram of a device configured to provide DHCP relay in a multipod network, according to an example embodiment.

With reference now made to FIG. 6, an example block diagram is shown of a device 600, and device 600 may be any one of a DHCP client, a DHCP server, a TOR switch, a spine switch, or an ML device described above with reference to FIGS. 1-4. Accordingly, device 600 is configured to perform the techniques described herein. Device 600 includes network interfaces (e.g., network ports) 610 which may be used to receive and send packets over a network. Accordingly, network interfaces 610 may be embodied as wired interfaces, wireless interfaces, optical interfaces, electrical interfaces, or a combination thereof. One or more processors 620 are provided to coordinate and control device 600. The processor 620 is, for example, one or more microprocessors or microcontrollers, and it communicates with the network interfaces 610 via bus 630. Memory 640 stores software instructions 642 which may be executed by the processor 620. For example, control software 642 for device 600 includes instructions for performing the packet generation and forwarding described above with reference to FIGS. 1-5. In other words, memory 640 includes instructions for device 600 to carry out the operations described above in connection with FIGS. 1-4.

Memory 640 may include read only memory (ROM), random access memory (RAM), magnetic disk storage media devices, optical storage media devices, flash memory devices, electrical, optical or other physical/tangible (e.g. non-transitory) memory storage devices. Thus, in general, the memory 640 may be or include one or more tangible (non-transitory) computer readable storage media (e.g., a memory device) encoded with software comprising computer executable instructions. When the instructions of the control software 642 is executed (by the processor 620), the processor is operable to perform the operations described herein in connection with FIGS. 1-4.

In summary, described herein are methods, apparatuses and software for extending the DHCP relay functionality in multipod VXLAN overlay fabric networks. A pod identifier and a pod local TEP IP of an originating TOR switch is encoded in a DHCP request packet so that responses may be forwarded to the correct TOR switch to achieve DHCP relay functionality. Furthermore, the techniques described herein provide DHCP relay across network address translation boundaries in an underlay network.

The techniques described herein provide DHCP relay functionality transparently across a multipod VxLAN overlay fabric even when the underlay addresses within each pod may overlap with underlay address in other pods, i.e., when the underlay addresses are only locally routable. The techniques described herein also provide DHCP relay functionality across network address translation boundaries. Other option 82 techniques in DHCP do not provide this functionality. The techniques described herein extend DHCP option 82 to work with overlay networks and through network address translation boundaries in the underlay infrastructure.

In summary, in one form, a method is providing comprising: generating, at a first network connected device, a packet for transmission to a destination network device through a network comprising a plurality of pods, wherein at least two of the plurality of pods are within separate management domains, wherein generating the packet comprises generating the packet with a first identifier and a second identifier, the first identifier indicating a pod of the plurality of pods in which the destination network connected device is located, and the second identifier indicating an identity of the destination network connected device within the pod of the plurality of pods; and transmitting the packet from the first network connected device to the destination network connected device.

In another form, a method is provided comprising: generating, at a first network connected device, a packet for transmission to a destination network connected device through a network comprising a plurality of pods, wherein at least two of the plurality of pods are within separate management domains, wherein generating the packet comprises generating the packet with a first identifier and a second identifier, the first identifier indicating a pod of the plurality of pods in which the first network connected device is located, and the second identifier indicating an identity of the first network connected device within the pod of the plurality of pods; and transmitting the packet from the first network connected device to the destination network connected device.

An apparatus may be provided that includes a network interface unit configured to enable network communications, and a processor coupled to the network interface unit configured to: perform the generating and transmitting operations of the above method.

In still another form, an apparatus is provided comprising a network interface unit configured to enable network communications; and a processor coupled to the network interface unit, wherein the processor is configured to: generate a packet for transmission to a destination network connected device through a network comprising a plurality of pods, wherein at least two of the plurality of pods are within separate management domains, wherein the processor is configured to generate the packet by generating the packet with a first identifier and a second identifier, the first identifier indicating a pod of the plurality of pods in which the apparatus is located, and the second identifier indicating an identity of the apparatus within the pod of the plurality of pods; and transmit the packet via the network interface unit to the destination network connected device.

In yet another form, a non-transitory computer readable storage media is provided that includes or is encoded with instructions which, when executed by a processor, cause the processor to perform the operations of these methods.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   receiving a packet at a first network connected device;
   extracting a pod identifier from the packet, wherein the pod identifier distinguishes between a first pod and a second pod of a network, and wherein the first pod and the second pod are in separate management domains;
   extracting an infrastructure identifier from the packet, wherein the infrastructure identifier uniquely identifies a second network connected device in the first pod and uniquely identifies a third network connected device in the second pod;
   comparing the pod identifier extracted from the packet with a pod identifier for a pod associated with the first network connected device; and
   routing the packet to the second network connected device in the first pod based upon the comparing.

2. The method of claim 1, wherein receiving the packet comprises receiving a Dynamic Host Configuration Protocol (DHCP) packet.

3. The method of claim 2, wherein the DHCP packet comprises a packet for a DHCP request message.

4. The method of claim 2, wherein the DHCP packet comprises a packet for a DHCP response message.

5. The method of claim 1, wherein routing the packet to the second network connected device based upon the pod identifier comprises:
   determining the pod identifier matches the pod identifier for the pod associated with the first network connected device; and
   routing the packet to the second network connected device based upon the infrastructure identifier.

6. The method of claim 1, wherein routing the packet to the second network connected device based upon the pod identifier comprises:
   determining the pod identifier does not match the pod identifier for the pod associated with the first network connected device; and
   routing the packet to the first pod based upon the pod identifier.

7. The method of claim 1, wherein the pod identifier comprises an External Tunnel Endpoint (ETEP) identifier.

8. An apparatus comprising:
   a network interface configured to enable network communications; and
   a processor coupled to the network interface, wherein the processor is configured to:
     receive, via the network interface, a packet;
     extract a pod identifier from the packet, wherein the pod identifier distinguishes between a first pod and a second pod of a network, and wherein the first pod and the second pod are in separate management domains;
     extract an infrastructure identifier from the packet, wherein the infrastructure identifier uniquely identifies a first network connected device in the first pod and uniquely identifies a second network connected device in the second pod;
     compare the pod identifier extracted from the packet with a pod identifier for a pod associated with the apparatus; and
     route the packet to the first network connected device in the first pod based upon the compare operation.

9. The apparatus of claim 8, wherein the packet comprises as a Dynamic Host Configuration Protocol (DHCP) packet.

10. The apparatus of claim 9, wherein the DHCP packet comprises a packet for a DHCP request message.

11. The apparatus of claim 9, wherein the DHCP packet comprises a packet for a DHCP response message.

12. The apparatus of claim 8, wherein the processor is configured to route the packet to the first network connected device based upon the pod identifier by:
   determining the pod identifier matches the pod identifier for the pod associated with the apparatus; and
   routing the packet to the first network connected device based upon the infrastructure identifier.

13. The apparatus of claim 8, wherein the processor is configured to route the packet to the first network connected device based upon the pod identifier by:
   determining the pod identifier does not match the pod identifier for the pod associated with the apparatus; and
   routing the packet to the first pod based upon the pod identifier.

14. The apparatus of claim 8, wherein the pod identifier comprises an External Tunnel Endpoint (ETEP) identifier.

15. A non-transitory computer readable medium encoded with instructions, wherein the instructions, when executed by a processor, cause the processor to:

receive a packet at a first network connected device;

extract a pod identifier from the packet, wherein the pod identifier distinguishes between a first pod and a second pod of a network, and wherein the first pod and the second pod are in separate management domains;

extract an infrastructure identifier from the packet, wherein the infrastructure identifier uniquely identifies a second network connected device in the first pod and uniquely identifies a third network connected device in the second pod;

compare the pod identifier with a pod identifier for a pod associated with the first network connected device; and route the packet to the second network connected device in the first pod based upon the compare operation.

16. The non-transitory computer readable medium of claim 15, wherein the packet comprises a packet for a Dynamic Host Configuration Protocol (DHCP) request message.

17. The non-transitory computer readable medium of claim 15, wherein the packet comprises a packet for a Dynamic Host Configuration Protocol (DHCP) response message.

18. The non-transitory computer readable medium of claim 15, wherein the instructions cause the processor to route the packet to the second network connected device based upon the pod identifier by:

determining the pod identifier matches the pod identifier for the pod associated with the first network connected device; and routing the packet to the second network connected device based upon the infrastructure identifier.

19. The non-transitory computer readable medium of claim 15, wherein the instructions cause the processor to route the packet to the second network connected device based upon the pod identifier by:

determining the pod identifier does not match the pod identifier for the pod associated with the first network connected device; and routing the packet to the first pod based upon the pod identifier.

20. The non-transitory computer readable medium of claim 15, wherein the pod identifier comprises an External Tunnel Endpoint (ETEP) identifier.

* * * * *